United States Patent

Bannai (10) Patent No.: US 6,697,092 B2
(45) Date of Patent: Feb. 24, 2004

(54) COLOR IMAGE FORMING APPARATUS WITH COLOR IMAGE SHIFT CORRECTION

(75) Inventor: Kazunori Bannai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/252,096

(22) Filed: Sep. 23, 2002

(65) Prior Publication Data

US 2003/0058324 A1 Mar. 27, 2003

(30) Foreign Application Priority Data

Sep. 21, 2001 (JP) ........................................ 2001-288799

(51) Int. Cl.⁷ .............................................. G03G 15/01
(52) U.S. Cl. ..................... 347/116; 347/234; 347/242
(58) Field of Search ................................ 347/116, 232, 347/234, 242; 399/299, 301; 359/204

(56) References Cited

U.S. PATENT DOCUMENTS

| | | |
|---|---|---|
| 4,916,547 A | 4/1990 | Katsumata et al. |
| 5,219,154 A | 6/1993 | Fukube et al. |
| 5,224,693 A | 7/1993 | Taguchi et al. |
| 5,227,842 A | 7/1993 | Hayashi et al. |
| 5,255,904 A | 10/1993 | Taguchi et al. |
| 5,270,783 A | 12/1993 | Bisaiji et al. |
| 5,297,376 A | 3/1994 | Taguchi et al. |
| 5,315,322 A | 5/1994 | Bannai |
| 5,316,282 A | 5/1994 | Fukube et al. |
| 5,325,213 A | 6/1994 | Takahashi et al. |
| 5,390,033 A | 2/1995 | Bannai et al. |
| 5,471,277 A | 11/1995 | Fujioka et al. |
| 5,583,607 A | 12/1996 | Fujioka et al. |
| 5,583,662 A | 12/1996 | Takahashi et al. |
| 5,610,720 A | 3/1997 | Fujioka et al. |
| 5,627,579 A | 5/1997 | Fisli |
| 5,682,227 A | 10/1997 | Taguchi et al. |
| 5,689,348 A | 11/1997 | Takahashi et al. |
| 5,847,845 A | 12/1998 | Takahashi et al. |
| 5,940,114 A | 8/1999 | Kataoka et al. |
| 6,002,413 A | 12/1999 | Nishizawa et al. |
| 6,075,624 A | 6/2000 | Bannai et al. |

FOREIGN PATENT DOCUMENTS

| | | | |
|---|---|---|---|
| EP | 0 930 772 | | 7/1999 |
| EP | 1 087 612 | | 3/2001 |
| JP | 10-157207 | | 6/1998 |
| JP | 10-228149 A | * | 8/1998 |
| JP | 2001-13432 | | 1/2001 |

\* cited by examiner

*Primary Examiner*—Joan Pendegrass
(74) *Attorney, Agent, or Firm*—Oblon, Spivak, McClelland, Maier & Neustadt, P.C.

(57) ABSTRACT

A color image forming apparatus of the present invention includes a deflector for deflecting a laser beam in order to form images of different colors. Pattern images for measurement are formed on sheet conveying means in the different colors. A sensor senses the positions of the pattern images. A counter and a computing circuit cooperate to determine the amount of shift of each pattern image from a particular reference position. To correct the shift of each pattern image, a write timing generator adjusts a write start timing while a beam shift driving circuit adjusts a writing position.

9 Claims, 9 Drawing Sheets

COLOR IMAGE FORMING APPARATUS WITH COLOR IMAGE SHIFT CORRECTION

BACKGROUND OF THE INVENTION

1. Field of the Invention

The present invention relates to a copier, printer or similar electrophotographic image forming apparatus and more particularly to a color copier, a color printer or similar color image forming apparatus capable of preventing colors constituting a color image from being shifted from each other.

2. Description of the Background Art

Today, color copiers, color printers and other color image forming apparatus are extensively used and include an electrophotographic color image forming apparatus of the type using a semiconductor laser as a light source. In this type of color image forming apparatus, a laser beam modulated in accordance with a color image signal output by reading a document scans a photoconductive element, photoconductive belt or similar image carrier, thereby forming an electrostatic latent image on the image carrier. The latent image is then developed by toner of corresponding color to become a toner image. Subsequently, the toner image is transferred to a sheet.

Another type of color image forming apparatus includes a plurality of image forming units each being assigned to a particular color. Generally, this type of color image forming apparatus includes four image forming units respectively assigned to black, yellow, magenta and cyan and is, in this sense, called a four-tandem engine. Images of four different colors are sequentially transferred to a single sheet or recording medium one above the other to thereby complete a full-color image. A problem with this type of image forming apparatus is the shift of the different color components or colors from each other, i.e., color shift.

More specifically, in a digital color copier, for example, the color shift is ascribable to an error in the mounting position or the peripheral speed of each photoconductive element, an error in an exposing position assigned to each photoconductive element, an error in the linear velocity of an image transfer belt or similar endless conveying means and so forth. It has been customary to reduce the color shift by increasing the dimensional accuracy and mounting accuracy of the individual structural part. This, however, increases the cost of parts and assembling cost and thereby lowers productivity. Another problem is that readjustments are necessary due to the aging or the replacement of the individual structural part.

To solve the problems stated above, Japanese Patent Publication No. 7-19083 and Japanese Patent No. 2765626, for example, each propose an image forming apparatus configured to form exclusive color-by-color pattern images for measurement. The proposed apparatus measures, by sensing the pattern images, errors in the image forming timings of the individual colors and corrects a write start timing color by is color on the basis of such errors.

However, the image forming apparatus with the above configuration uses polygonal mirrors or similar deflectors for color-by-color writing. It is therefore necessary to control the rotation phase of each deflector before writing an image of corresponding color and to accurately drive the deflector at a constant speed during image formation. Consequently, when the color shift is corrected color by color only by the write start timing, the correction timing is limited to an integral multiple of a period of time necessary for a single scanning. Correction with accuracy higher than the period of time necessary for a single scanning is not achievable without adjusting the rotation phase of the deflector. However, the rotation phase of the deflector cannot be adjusted unless the deflector rotation speed is adjusted by temporary acceleration or deceleration. In practice, such phase correction is not only time-consuming but also technically difficult to practice and costly because the deflector rotates at high speed.

Although the above documents do not describe correction with accuracy higher than the period of time necessary for a single scanning specifically, they fail to effect such correction for the reasons described above and cannot obviate an error ascribable to short accuracy.

Further, in an image forming apparatus of the type deflecting laser beams assigned to different color images with a single deflector in order to reduce cost, the writing phases of different colors are always identical and therefore cannot be adjusted in phase color by color. It follows that when the color shift is corrected color by color only on the basis of the write start timing, correction must be done by using only the unit period of time necessary for a single scanning.

Technologies relating to the present invention are also disclosed in, e.g., Japanese Patent Laid-Open Publication Nos. 10-157207 and 2001-13432.

SUMMARY OF THE INVENTION

It is an object of the present invention to provide a color image forming apparatus capable of accurately correcting color shift color by color when writing each color image with a laser beam to thereby enhance image quality and reliability.

A color image forming apparatus of the present invention forms a composite color image by superposing a plurality of images of different colors on a recording medium. The apparatus includes a deflector for deflecting a laser beam, a writing device for writing a latent image on a photoconductive element with the laser beam deflected by the deflector, a plurality of developing means each for developing the latent image assigned to a particular color to thereby form a corresponding toner image, and a conveyor for conveying the recording medium. A drive circuit causes the writing device to shift the optical axis of the laser beam. A computing circuit determines the amount of positional shift of each image of a particular color. A first correcting circuit corrects, based on the positional shift determined by the computing circuit, a timing at which the writing device starts writing each image of a particular color. A second correcting circuit causes, based on the positional shift determined by the computing circuit, the drive circuit to shift the optical axis of the laser beam to thereby shift in the subscanning direction the position of the photoconductive element where the laser beam is incident.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
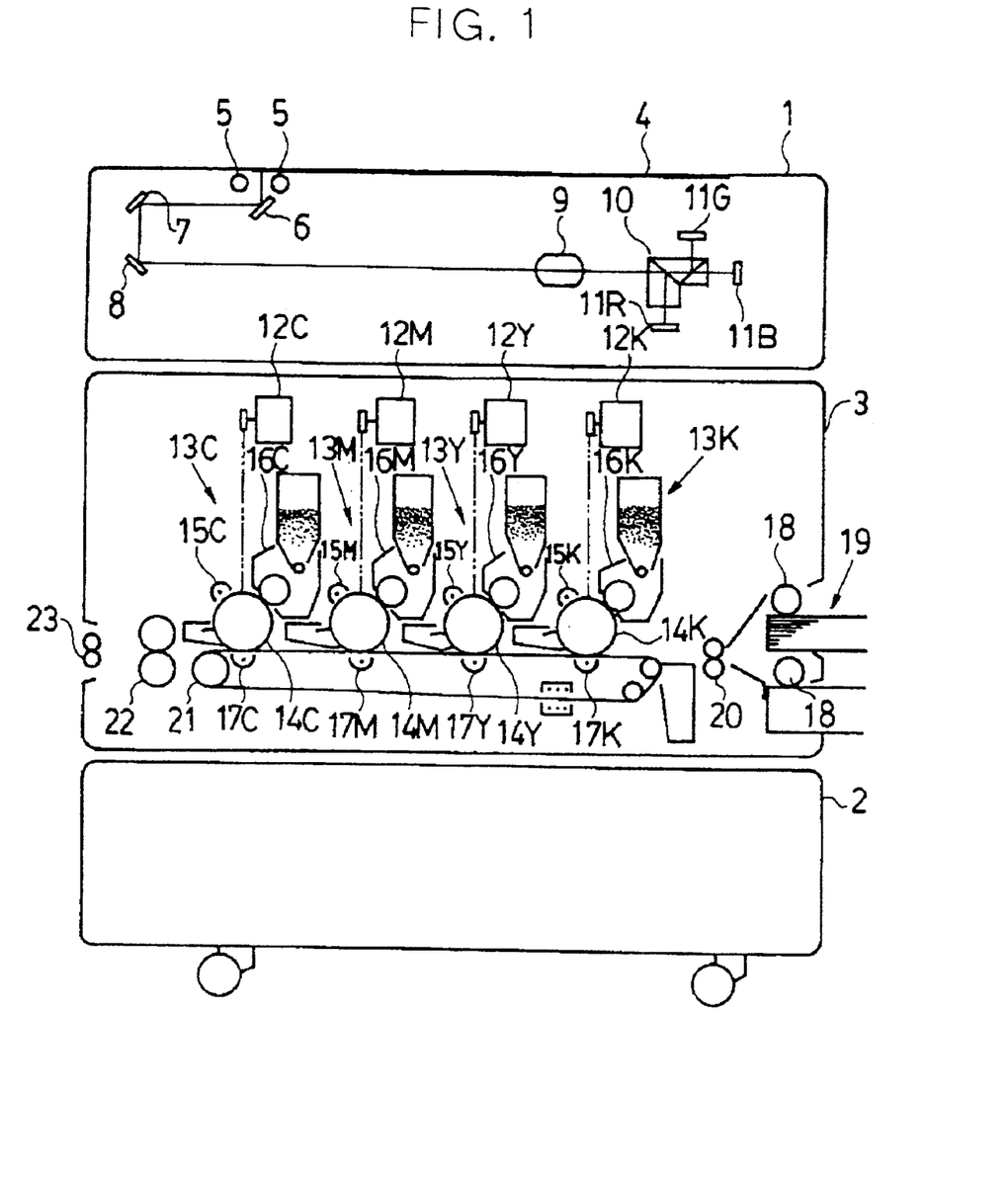
FIG. 1 is a view showing the general construction of a color image forming apparatus embodying the present invention.
Figure 2:
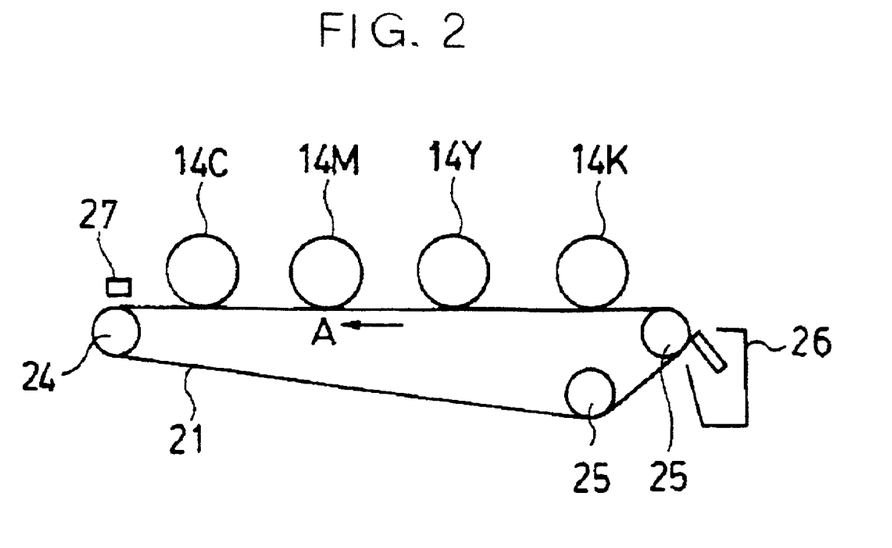
FIG. 2 is a view showing a transfer belt included in the illustrative embodiment together with members adjoining the belt.

Referring to FIGS. 1 and 2 of the drawings, a color image forming apparatus embodying the present invention and implemented as a digital color copier by way of example will be described. As shown, the digital color copier includes a scanner 1 for reading a document, an image processor 2 for electrically processing image signals output from the scanner 1 as digital signals, and an image forming unit 3 for forming an image on a sheet or recording medium in accordance with color-by-color image data output from the image processor 2.

The scanner 1 includes a lamp 5, e.g., a fluorescence lamp for illuminating a document placed on a glass platen 4. The resulting reflection from the document is incident to a lens 9 after being sequentially reflected by mirrors 6, 7 and 8. The light incident to the lens 9 is focused on a dichroic prism 10 and split into three lights each having a particular wavelength thereby. The three lights different in wavelength may be R (red), G (green) and B (blue) lights by way of example. The, R, G and B lights are respectively incident to CCD (Charge Coupled Device) image sensors 11R, 11G and 11B assigned to red, green and blue, respectively. The CCD image sensors 11R through 11B each convert the incident light to a corresponding digital signal and feed the digital signal to the signal processor. The signal processor 2 executes necessary processing with such digital signals output from the CCD image sensors 11R through 11B to thereby output, e.g., K (black), Y (yellow), M (magenta) and C (cyan) image data for image formation.

While the illustrative embodiment is shown in FIG. 1 as forming images of four colors K, Y, M and C, it may alternatively be configured to use only three colors, in which case one of recording units shown in FIG. 1 will be omitted.

The signals from the image processor 2 are applied to the image forming unit 3 and respectively input to laser beam emitters 12K, 12Y, 12M and 12C included in the image forming unit 2.

In the illustrative embodiment, the image forming unit 3 includes four recording units 13C, 13M, 13Y and 13K arranged in an array. Because the recording units 13A through 13K have identical structural elements, the following description will concentrate on the recording unit 13C assigned to cyan by way of example. The structural elements of the other recording units 13M, 13Y and 13K are simply distinguished by suffixes M, Y and K. In the following description, structural elements will be designated only by reference numerals when generally referred to or designated by reference numerals with a particular suffix when referred to in relation to a particular color.

The recording unit 13C includes a photoconductive drum 14C, which is a specific form of a photoconductor, in addition to the laser beam emitter or writing means 12C. Arranged around the drum 14C are a main charger 15C, a developing device 16C, a transfer charger 17C, and so forth. The charger 15C uniformly charges the surface of the drum 14C. The laser beam emitter 12C scans the charged surface of the drum 14C with a laser beam to thereby form a latent image thereon (cyan latent image hereinafter). The developing device 16C develops the cyan latent image for thereby forming a cyan toner image.

On the other hand, a sheet is fed from one of two sheet cassettes paper feed section 19 by a pickup roller 18 to a registration roller pair 20. The registration roller pair 20 conveys the sheet to a belt or conveying means 21 at a preselected timing. The sheet is accurately conveyed by the belt 21 at the speed of the belt 21 while being electrostatically retained on the belt 21. While the belt 21 conveys the sheet via the consecutive drums 14K through 14Y, transfer chargers 17K through 17C sequentially transfer toner images formed on the drums 14K through 14Y to the sheet one above the other to thereby complete a full-color image on the sheet. Subsequently, the sheet with the full-color image, i.e., a print has the image fixed by a fixing roller pair 22 and then driven out of the copier by an outlet roller pair 23.

As shown in FIG. 2, the belt 21 is passed over a drive roller 24 and driven rollers 25 and moves in a direction indicated by an arrow A while carrying the sheet thereon. A reflection type sensor or sensing means 27 is positioned downstream of the drums 14 in the direction A for sensing pattern images of different colors for measurement, which will be described later specifically. A cleaning unit 26 is positioned upstream of the drums 14 in the direction A for removing the pattern images sensed.

The cleaning unit 26 and sensor 27 are positioned at substantially opposite sides on the conveyance path of the belt 21. This arrangement prevents fine toner grains scattered during the operation of the cleaning unit 26 from depositing on the surface of the sensor 27 and lowering the sensitivity of the sensor 27, thereby maintaining the sensor 27 reliable lover a long period.

Figure 3:
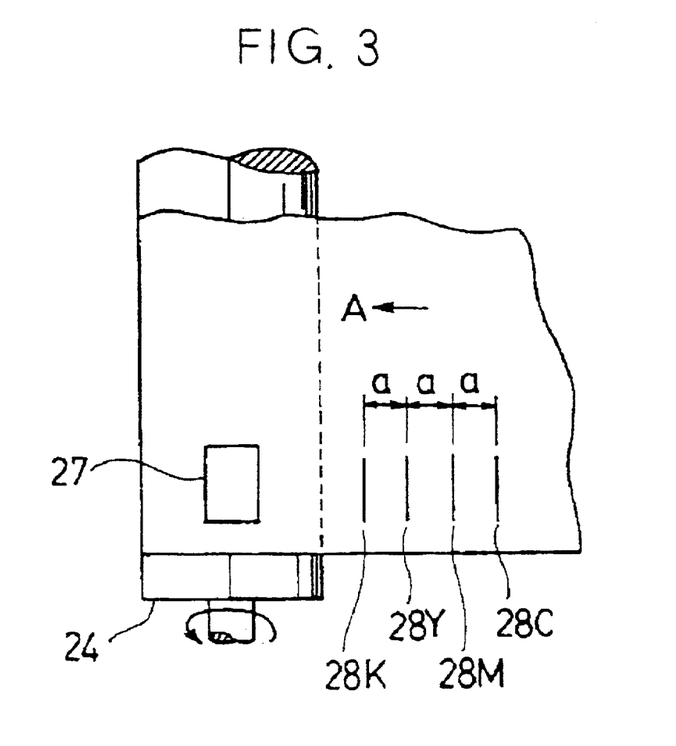
FIG. 3 is a fragmentary, enlarged plan view of the transfer belt.

Reference will be made to FIGS. 3 through 6 for describing the register of images of different colors achievable with the illustrative embodiment. In the illustrative embodiment, for the register of images of different colors, each recording unit 13 forms a pattern image 28 of particular color for measurement on the belt 21 outside of a sheet conveying area in response to a command received from a controller not shown. The controller plays the role of pattern image forming means. FIG. 3 shows specific pattern images 28K, 28Y, 28M and 28C formed at intervals of a (mm) in the direction A. As shown, the pattern images 28K through 28C each are implemented as a line extending perpendicular to the direction A.

As the transfer belt 21 moves, the pattern images 28 (28K, 28Y, 28M, 28C) are sequentially passed under the sensor 27 and optically sensed by the sensor 27.

The interval a may have any numerical value that can be selected by setting an exposure timing for the individual recording unit 13. Assuming the linear speed of the transfer belt 21 to be V2 (mm/sec), then a time lag in the sensing of nearby ones of the pattern images 28K, 28Y, 28M, 28C is a/V2 (sec).

Figure 4:
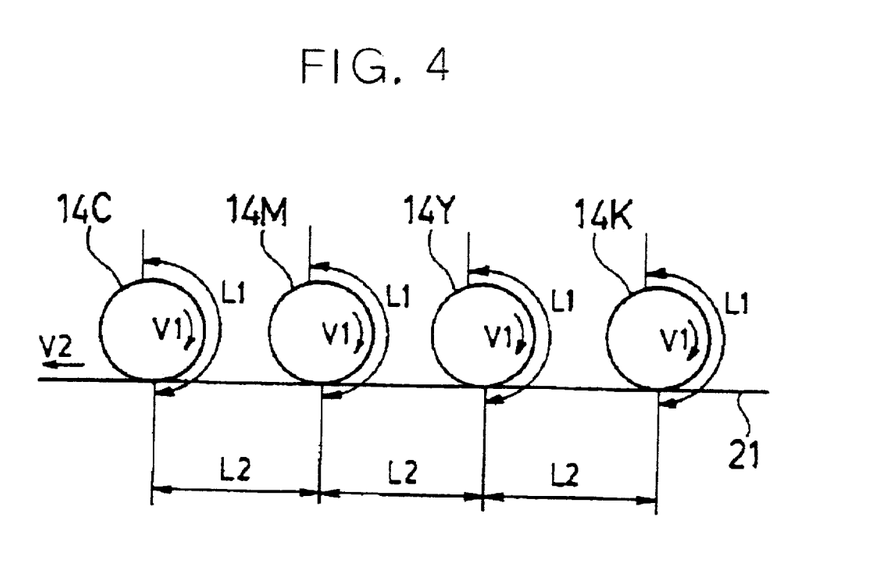
FIG. 4 is a view for describing intervals between pattern images for measurement with respect to the transfer belt.

The pattern images 28 can be sequentially formed at the intervals a if they are formed at the following timings, on the assumption that the timings are free from errors. Assume that the distance from the exposure position to the transfer position on each drum 14 is L1 (mm), that the linear velocity of the drum 14 is V1 (mm/sec), and that the distance between nearby drums 14 is L2 (mm). Then, a period of time T1 from exposure to image transfer is represented by L1/V1 (sec) throughout the drums 14. A period of time T2 necessary for the belt 21 to move between nearby drums 14 is L2/V2 (sec).

Therefore, to form the pattern images 28 at the intervals a, the pattern images 28 should only be written at the following timings when the pattern image 28K is used as a reference:

cyan $TC=(L2+a)/V2$ (sec)

magenta $TM=2(L2+a)/V2$ (sec)

yellow $TY=3(L2+a)/V2$ (sec)

Figure 5:
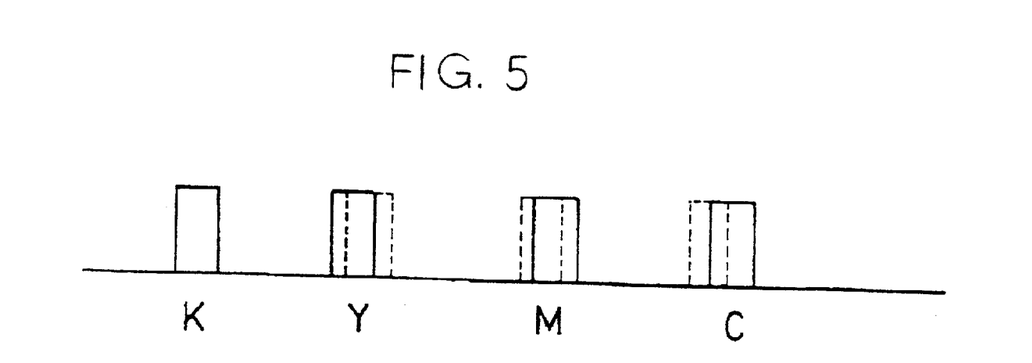
FIG. 5 is a view showing specific timings at which the pattern images are sensed.

In practice, however, there cannot be avoided an error in the position of each drum 14, an error in the exposing position assigned to each drum 14, an error in the linear velocity of the drum 14 and that of the belt 21, and an error in the phase of the deflecting means of each writing unit. As a result, the interval between nearby pattern images 28 formed on the belt 21 differs from the expected interval a even if writing is commanded at the timings stated above, resulting in color shift in the composite image transferred to a sheet. More specifically, as shown in FIG. 5, the timings at which the sensor 27 senses the consecutive pattern images 28 are slightly deviated from theoretical values indicated by phantom lines.

Figure 6:
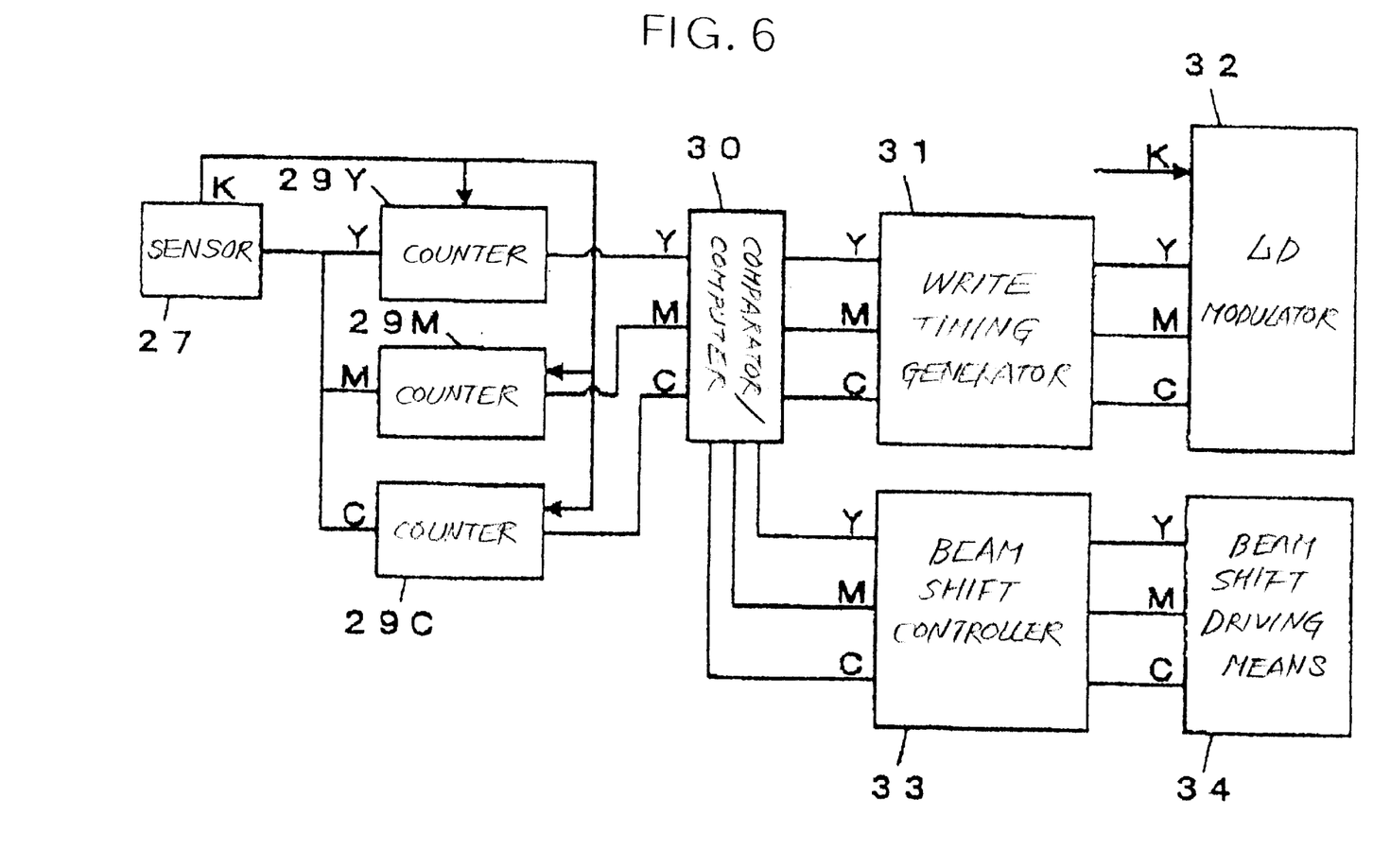
FIG. 6 is a schematic block diagram showing a control system included in the illustrative embodiment.

FIG. 6 shows a control system included in the illustrative embodiment. As shown, the control system includes counters 29Y, 29M and 29C to which signals output from the sensor 27 are input. The order of the pattern images 28 do not vary although the pattern images 28 may be slightly dislocated. Therefore, if the pattern images are formed at the timings stated above, then the first signal output from the sensor 27 is representative of the pattern image 28K while the successive signals are representative of the pattern images 28Y, 28M and 28C, respectively.

All the counters 29C, 29M and 29Y are reset by the signal representative of the pattern image 28K and then start counting. The counter 29C, for example, ends counting in response to the signal representative of the pattern image C. Likewise, the other counters 29M and 29Y end counting in response to the signals representative of the M and Y pattern images 28M and 28Y, respectively. Circuits following the counters 29C, 29M and 29Y deal with C, M and Y in exactly the same manner, so that the following description will concentrate on C by way of example. In the illustrative embodiment, the position of the pattern image 28K to be formed first is used as a reference.

On stopping counting, the counter 29C sends its count to a comparator/computer or computing means 30. The comparator/computer 30 compares the input count with a preselected reference count to thereby produce a difference in terms of a period of time. More specifically, assuming that the count clock frequency is M (Hz), that the actual count is KC, and that the reference count is KCs, then the comparator/computer 30 calculates a difference between the actual value KC/M and the reference value TKC=KCs/M, i.e., $\Delta TC=KC/M-CK\times/M$.

The above difference $\Delta TC$ is representative of a difference between the actual interval between the pattern images 28K and 28C and the reference interval. Further, the comparator/computer 30 divides the difference $\Delta TC$ by a period of time Tp necessary for a single scanning effected by the laser beam to thereby produce the integral portion n and residual t of the quotient.

For example, assume that a polygonal mirror having six reflection faces rotates at a speed of 20,000 rpm (revolutions per minute), and that a single-beam LD forms an image having a pixel density of 600 dpi (dots per inch). Then, the laser beam scans the polygonal mirror at an interval of 0.5 millisecond (ms) while the drum 14 moves by 42.3 $\mu$m (X) for the above interval. If two laser beams are used, then the drum 14 moves by 84.6 $\mu$m.

If the difference $\Delta TC$ between the actual interval between the pattern images 28K and 28C and the reference interval is 4.8 $\mu$m by way of example, then the integral portion n and residual t are 9 ms and 0.3 ms, respectively.

The integral portion n of the quotient is input to a write timing generator or first correcting means 31 as a value for correcting the write start timing. In response, the write timing generator 31 corrects the write start timing such that a C image will start being written at a timing n lines (n×Tp in terms of time) earlier than the reference timing. The write timing generator 31 then causes an LD modulator 32 to start driving an LD at the corrected timing. In the case where the difference $\Delta TC$ is a negative value, then the integral portion n is also negative, so that the write timing generator 31 causes the LD modulator 32 to drive the LD at a timing later than the reference timing.

Further, by using the residual t, the comparator/computer 30 calculates the size of a difference $\Delta X=t/Tp\times X$, which cannot be corrected by the write timing generator 31, and feeds it to a beam shift controller or second correcting means 33 as a beam position correction value.

In the above example, the value $\Delta X$ is expressed as:

$\Delta X=0.3$ ms/0.5 ms×42.3 $\mu$m=25.4 $\mu$m

The beam shift controller 33 drives beam shift driving means 34, which shifts the optical axis of a laser beam, in accordance with the value $\Delta X$. In response, the beam shift driving means 34 shifts, or corrects, the position of the laser beam on the drum 14 by the value X in the subscanning direction. In this example, the laser beam is shifted by 25.4 $\mu$m on the drum 14 in the direction of rotation of the drum 14.

In the illustrative embodiment, the control described above can precisely correct a positional shift with accuracy higher than the unit time necessary for a single scanning. Such a correction scheme is also effective when applied to a color image forming apparatus of the type writing images of different colors with a single LD unit and a deflector, although not shown specifically.

A specific configuration of the beam shift driving means 34 will be described with reference to FIG. 7 through 12. The crux of the beam shift driving means 34 is that it can accurately control the beam position on the drum 14. For example, use may be made of means for shifting a turn-back mirror included in the laser beam emitter 12 to thereby shift the beam position or means for varying the angle of a sheet glass, which is positioned in front of a deflector and inclined relative to a laser beam, to thereby shift the beam position in the subscanning direction. However, it is preferable to use means for varying the position of a LD unit, which includes a laser diode and coupling optics mounted on a holder, in the subscanning direction to thereby shift the beam position.

Figure 7A:
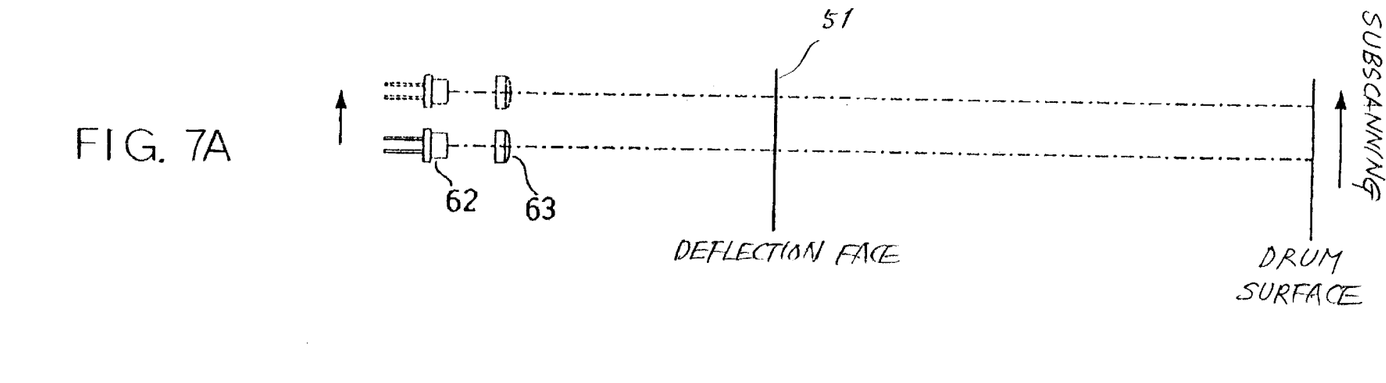
FIGS. 7A and 7B are views each showing a particular condition wherein the optical axis of a laser beam is shifted by beam shift driving means included in the illustrative embodiment.

As shown in FIG. 7A, the above shift is achievable if an LD unit has an LD 62 and a collimator lens or coupling optics 63 mounted on a support member and is shifted in the axial direction of a deflector while maintaining the orientation of the optical axis of the LD 62. This kind of shifting means needs a minimum of additional parts. It is to be noted that FIGS. 7A and 7B do not show mirrors and other parts present on the optical path of the laser beam other than the face 51 of the deflector and simply use a line for indicating the entire optical axis.

Figure 7B:
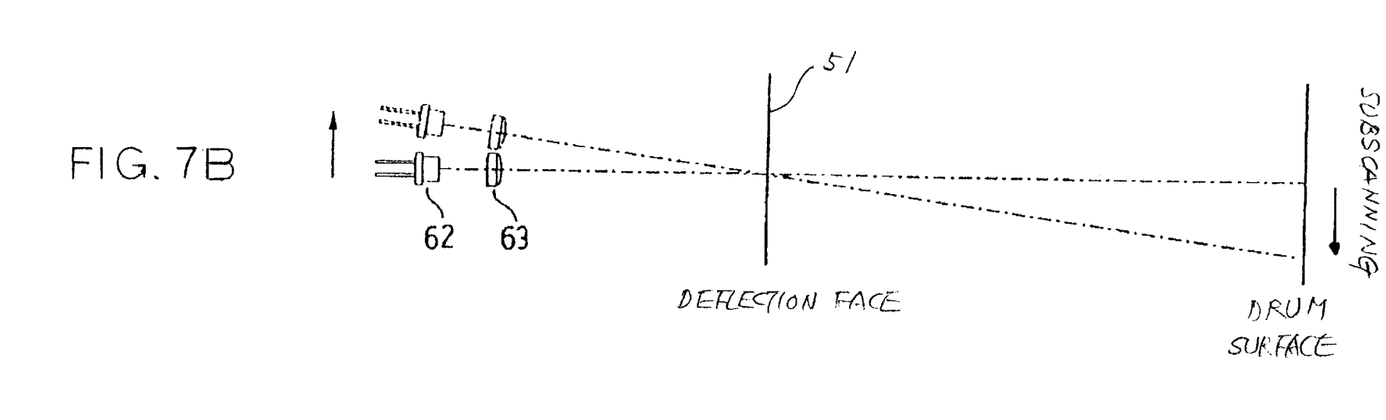

FIG. 7 shows another specific scheme that shifts the beam position by shifting the LD unit such that a position where the optical axis of the LD 62 and the face 51 of the deflector intersect does not move. It should be noted that the schemes shown in FIGS. 7A and 7B are opposite to each other as to the relation between the direction in which the LD unit is shifted and the direction in which the beam position is shifted.

Figure 8:
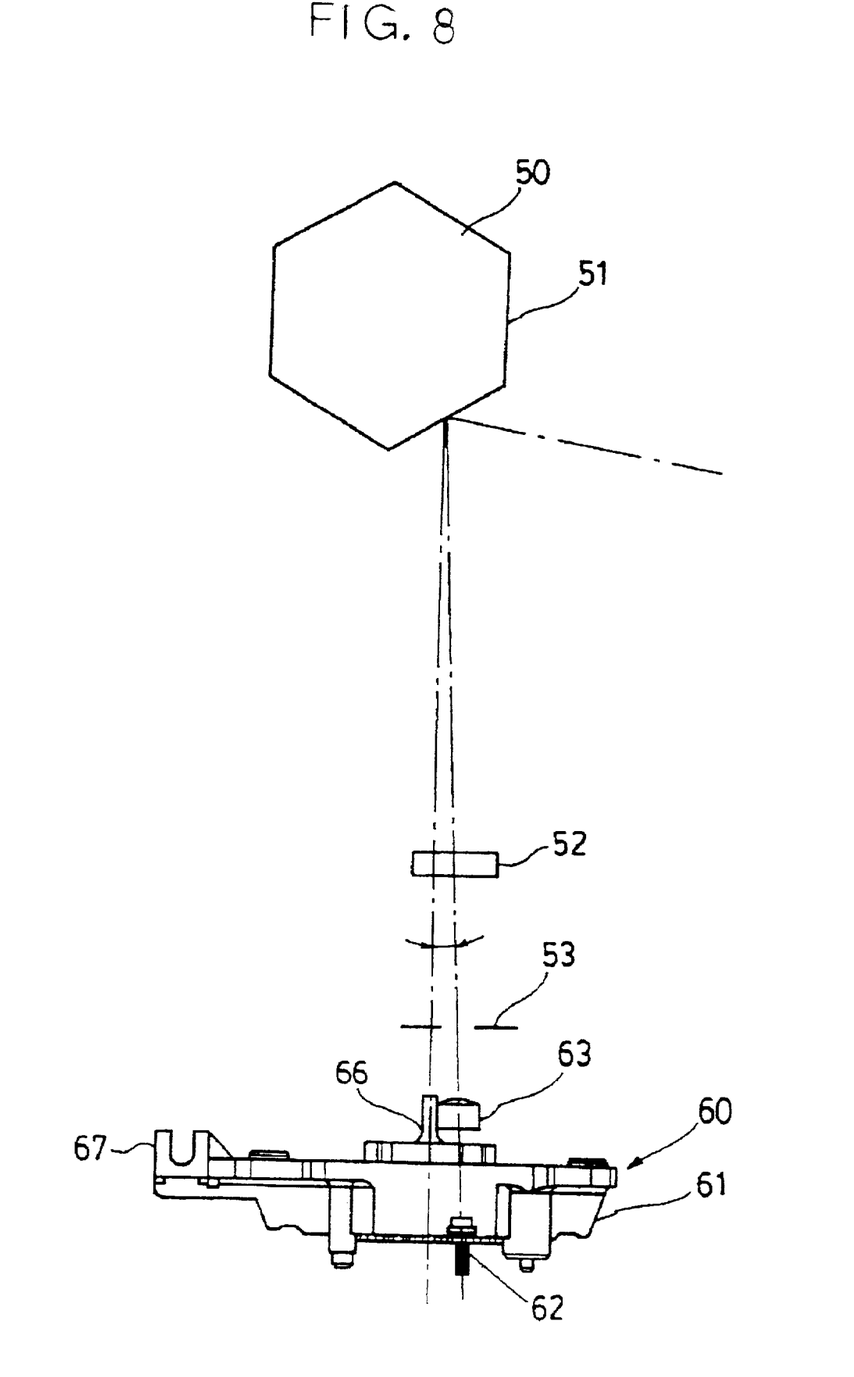
FIG. 8 is a view showing a specific configuration of a laser beam emitter included in the illustrative embodiment, paying attention to an optical housing.

FIG. 8 shows a specific arrangement for implementing the shift of the beam position described with reference to FIG. 7B. As shown, an LD unit 60 includes an LD base 61 supporting the LD 62 and collimator lens 63. The LD unit 60 is rotatable relative to an optical housing supporting a deflector 50, an aperture 53 configured to form a laser beam image on the photosensitive drums 14, a cylindrical lens 52 and other optical elements including mirrors not shown. Although the optical housing is not shown in FIG. 8, a shaft 66 about which the LD unit 60 is rotatable should only be rotatably mounted to the optical housing.

The axis of rotation of the LD unit 60 and the optical axis of the LD 62 intersect each other on the surface 51 of the deflector 50, which deflects a laser beam. Such an arrangement, however, should not be strict. The crux is that the two axes join each other at substantially the same position on the surface 51 of the deflector 50. In this configuration, when the beam position on the drum 14 should be shifted, there can be reduced the variation of the optical characteristics ascribable a change in optical path and therefore, e.g., a change in spot diameter, so that image quality is prevented from being lowered.

Although the LD unit 60 may be so configured as to be rotatable about the whole axis of rotation, correction can be done without causing the LD unit to rotate over such a broad angular range. The axis of the LD 62 should preferably be perpendicular to the axis of rotation of the deflector 50 and positioned in the proximity of a plane (sheet surface in FIG. 8) containing the axis of rotation of the LD unit 60. Therefore, the LD unit 60 should only be rotatable around such a position. In this condition, the LD unit 60 rotates about the axis of rotation, the LD 62 is displaced mainly in the direction in which the axis of rotation of the deflector 50 extends. It is therefore possible to efficiently shift the beam position on the drum 14 in the subscanning direction with a minimum of displacement of the beam position on the drum 14 in the main scanning direction.

Figure 9:
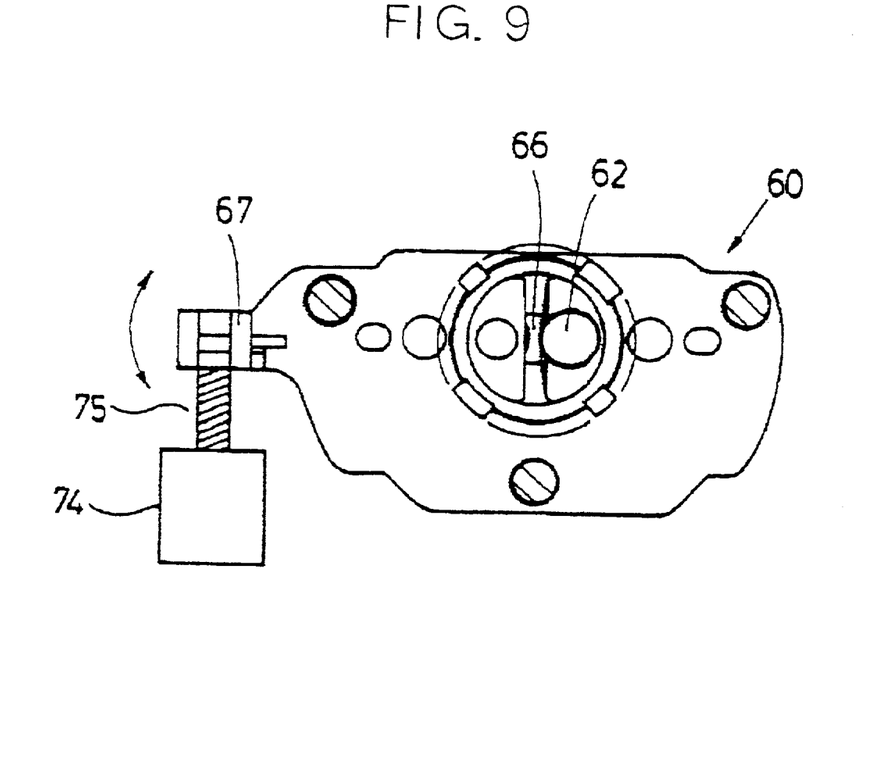
FIG. 9 is a view showing a mechanism for rotating an LD (Laser Diode) unit included in the laser beam emitter, as seen from a side opposite to a deflector.

FIG. 9 shows a specific configuration of the beam shift driving means 34. As shown, the beam shift driving means 34 includes a lead screw 75 fitted in a fitting portion 67 included in the LD unit 60 and a motor 74 for driving the lead screw 75. The motor 74 is driven in accordance with a drive signal output from the beam shift controller 33 to selectively deliver or withdraw the lead screw 75 in the up-and-down direction in FIG. 9. The lead screw 67 and motor 74 are not shown in FIG. 8.

Figure 10:
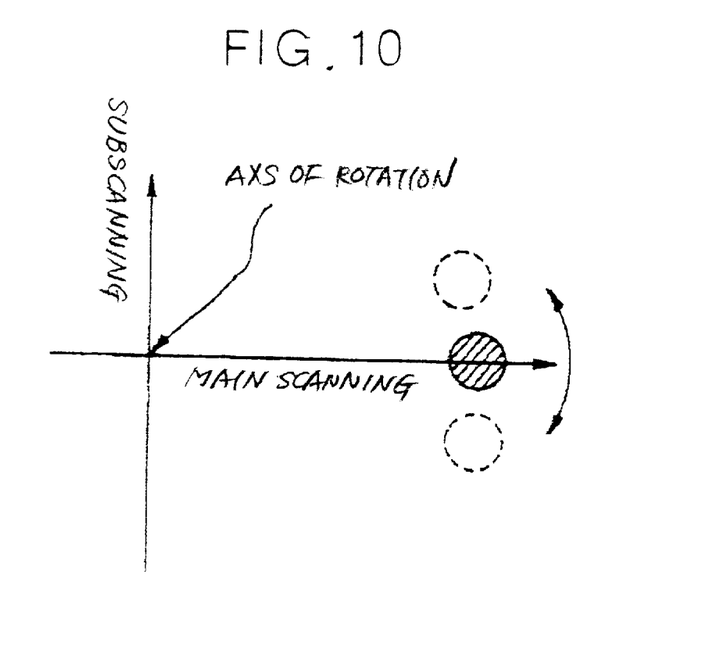
FIG. 10 demonstrates how a beam spot is shifted when the beam shift driving means shifts the optical axis of the laser beam.

In the above configuration, the beam shift controller 33 sends a signal representative of a shift corresponding to the beam position correction value $\Delta X$ to the motor 74, thereby rotating the LD unit 60. As a result, the optical axis of the LD 62 is shifted, as shown in FIG. 7B. At this time, the beam position on the drum 14 is shifted, as shown in FIG. 10. In the illustrative embodiment, the motor 74 is implemented as a stepping motor that completes one rotation in response to twenty pulses.

In FIG. 10, a shaded circle is representative of a scanning position in a condition wherein, when the optical axis of the LD 62 is projected on the sheet surface of FIG. 8, the optical axis is farthest from the axis of rotation of the LD unit 60. When the LD unit 60 is rotated from the above position, the scanning position is shifted to either one of the positions indicated by dotted circles in substantially the subscanning direction, as indicated by a double-headed arrow. Therefore, the optical axis of the LD 62 when the beam position correction value is 0 should preferably be positioned farthest from the axis of rotation of the LD unit 60 when projected on the sheet surface of FIG. 8.

Figure 11:
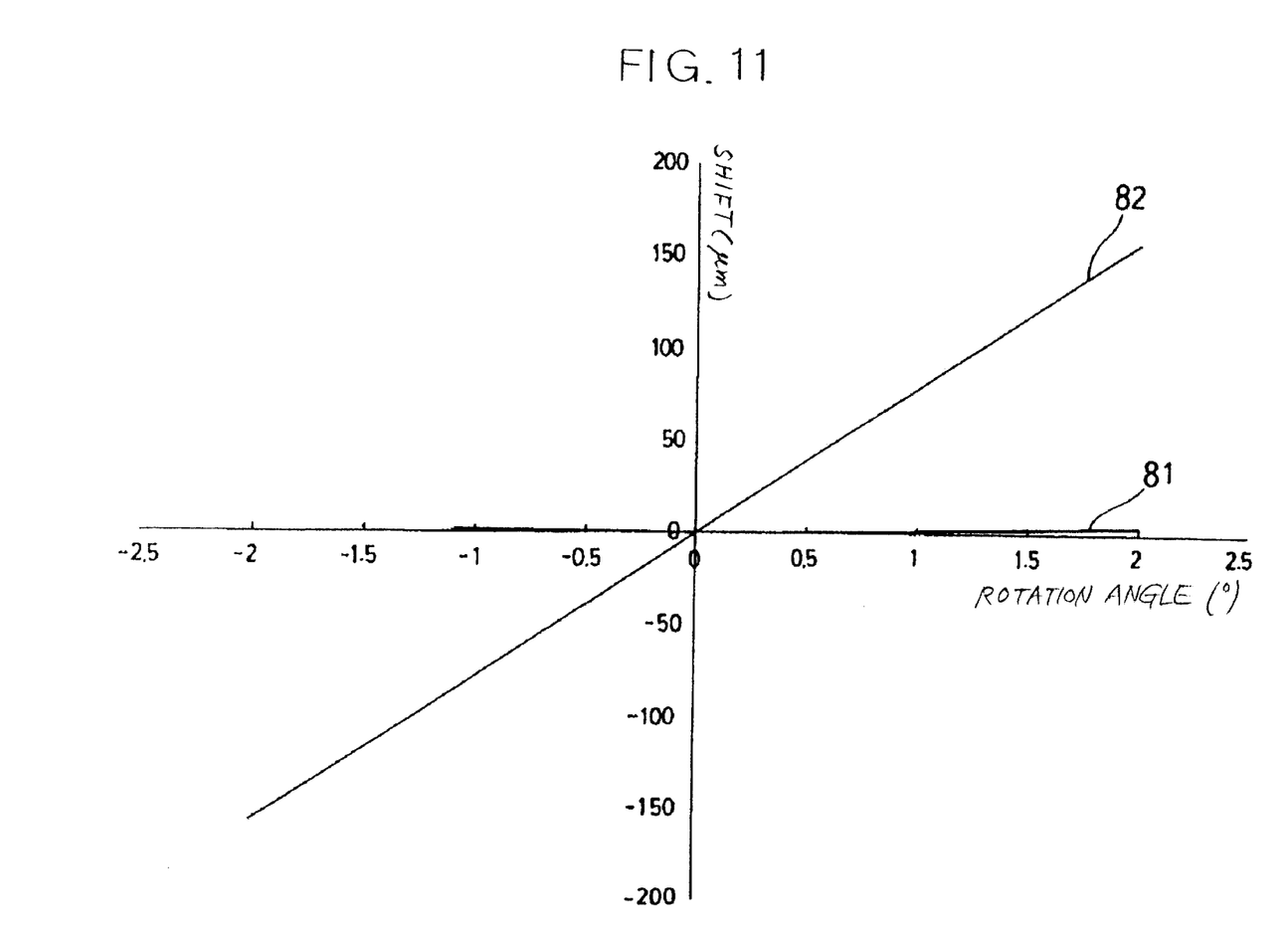
FIG. 11 is graph showing a relation between the rotation angle of the LD unit and the shift of a scanning position in the main and subscanning directions in the condition of FIG. 10.
Figure 12:
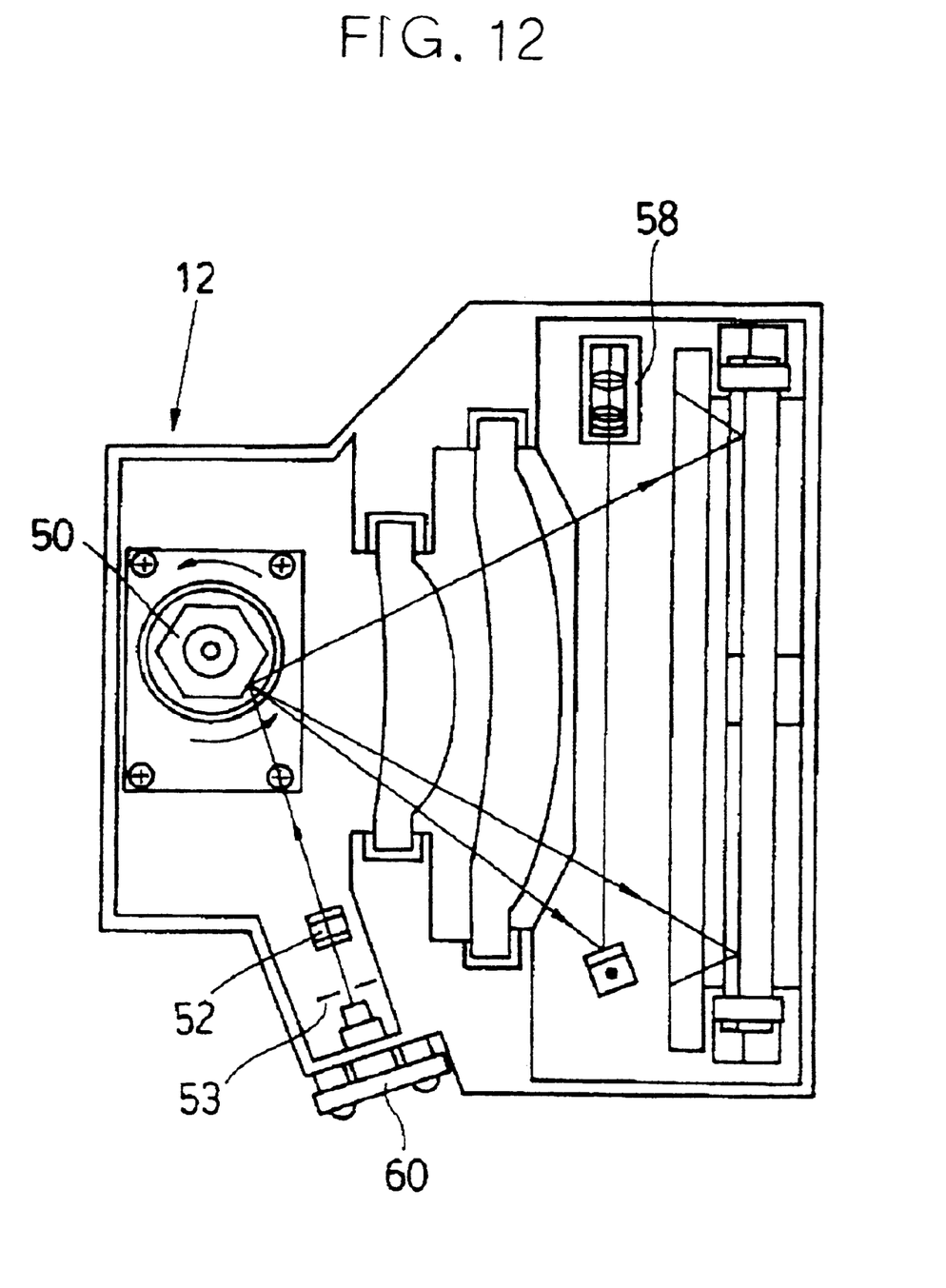
FIG. 12 is a view showing a specific configuration of the laser emitter of FIG. 8.

FIG. 11 shows a relation between the rotation angle of the LD unit 60 and the beam position on the drum 14 in the condition described above with reference to FIG. 10. A shift in the subscanning direction for a pulse input to the stepping motor was about 1 m and implemented sufficient resolution. As shown in FIG. 11, the shift in the subscanning direction indicated by a line 82 is generally proportional to the rotation angle while the shift in the main scanning direction indicated by a line 81 is far smaller than the shift in the subscanning direction. Such a shift in the main scanning direction does not effect image quality at all because it is extremely small and because, as shown in FIG. 12, the laser beam emitter 12 additionally includes a synchronization sensor 58 for correcting the scanning position in the main scanning direction.

Moreover, the beam shift driving means 34 corrects minute shifts that cannot be corrected on the basis of the unit time necessary for a single scanning, as stated earlier. Therefore, in the illustrative embodiment, even the maximum correction amount is as small as 42.3 $\mu$m, which is achievable with drive as fine as 1° or less in terms of rotation angle. The correction therefore does not effect optical characteristics including a beam diameter and insures high-quality images.

As stated above, the beam shift driving means 34 can correct the beam position on the drum 14 in the subscanning direction accurately with high resolution.

In the illustrative embodiment, the position of a black image is used as a reference for positioning color images, so that the beam shift driving means 34 described above does not have to be arranged in the recording unit 13K. Of course, the position of any another color image may be used as a reference for positioning. It is needless to say that the order of arrangement of the recording units 13 each being assigned to a particular color, the order of formation of the pattern images 28 and the colors of images shown and described are only illustrative.

While the illustrative embodiment has been shown and described as correcting a positional shift by executing both of write timing correction and beam position correction, beam position correction, in principle, can correct a positional shift alone. However, when the amount of correction is great, executing both of write timing correction and beam position correction is desirable because such an amount of correction is apt to vary the spot diameter on the drum 14 and adversely effect image quality.

In summary, it will be seen that the present invention provides a color image forming apparatus capable of precisely correcting a positional shift with accuracy higher than a single scanning unit and therefore insuring high-quality images at low cost. Further, the correction does not effect optical characteristics including a beam diameter.

Various modifications will become possible for those skilled in the art after receiving the teachings of the present disclosure without departing from the scope thereof.

What is claimed is:

1. A color image forming apparatus for forming a composite color image by superposing a plurality of images of different colors on a recording medium, said color image forming apparatus comprising:
    a deflector for deflecting a laser beam;
    a writing unit for writing a latent image on a photoconductive element with the laser beam deflected by said deflector;
    a plurality of developing units each for developing the latent image assigned to a particular color to thereby form a corresponding toner image;
    conveying means for conveying the recording medium;
    a drive unit for causing said writing means to shift an optical axis of the laser beam;
    computing means for determining an amount of positional shift of each of the images of different colors;
    a first correcting unit configured to correct, based on the positional shift determined by said computing means, a timing at which said writing unit starts writing each image of a particular color; and
    a second correcting unit configured to cause, based on the positional shift determined by said computing means, said drive unit to physically shift at least a portion of the writing unit to shift an optical axis of the laser beam in a subscanning direction relative to the photoconductive element where the laser beam is incident.

2. The apparatus as claimed in claim 1, further comprising:
    pattern image forming means for forming pattern images for measurement on said conveying means in the different colors; and
    sensing means for sequentially sensing said pattern images;
    wherein said computing means includes means for determining the amount of shift of each of said pattern images from a particular reference position in accordance with an output of said sensing means.

3. The apparatus as claimed in claim 1, wherein said computing means includes means for determining the amount of shift in terms of time and for dividing said amount of shift by a period of time Tp necessary for a single scanning to be effected by the laser beam to thereby produce an integral portion n and a residual t of a resulting quotient,
    said first correcting unit is configured to correct the write start timing by a period of time of n×Tp, and assuming that said photoconductive element advances by a distance of X for the period of time Tp, then said second correcting unit is configured to correct the position where the laser beam is incident to said photoconductive drum by t/Tp×X.

4. The apparatus as claimed in claim 1, wherein said writing unit comprises a laser diode unit in which a laser and coupling optics are affixed to a support member, and
    said drive unit corrects the position of the laser beam on said photoconductive element in the subscanning direction by shifting at least a portion of the laser diode unit relative to other members constituting said writing means.

5. The apparatus as claimed in claim 4, wherein said computing means includes means for determining the amount of shift in terms of time and for dividing said amount of shift by a period of time Tp necessary for a single scanning effected by the laser beam to thereby produce an integral portion n and a residual t of a resulting quotient,
    said first correcting unit is configured to correct the write start timing by a period of time of n×Tp, and assuming that said photoconductive element advances by a distance of X for the period of time Tp, then said second correcting unit is configured to correct the position where the laser beam is incident to said photoconductive element by t/Tp×X.

6. The apparatus as claimed in claim 2, wherein said writing unit comprises a laser diode unit in which a laser and coupling optics are affixed to a support member,
    said laser diode unit is rotatable relative to other members constituting said writing unit,
    the optical axis of said laser is perpendicular to an axis of rotation of said deflector and positioned at the proximity of a plane containing an axis of rotation of said laser diode unit, and
    said drive unit corrects the position of the laser beam on said photoconductive element in the subscanning direction by rotating said laser diode unit relative to the other members constituting said writing unit.

7. The apparatus as claimed in claim 6, wherein said computing means includes means for determining the amount of shift in terms of time and for dividing said amount of shift by a period of time Tp necessary for a single scanning effected by the laser beam to thereby produce an integral portion n and a residual t of a resulting quotient,
    said first correcting unit is configured to correct the write start timing by a period of time of n×Tp, and
    assuming that said photoconductive element advances by a distance of X for the period of time Tp, then said second correcting unit is configured to correct the position where the laser beam is incident to said photoconductive element by t/Tp×X.

8. The apparatus as claimed in claim 6, wherein the axis of rotation of said laser diode unit and the optical axis of said laser intersect each other at a position where said deflector deflects the laser beam.

9. The apparatus as claimed in claim 8, wherein said computing means includes means for determining the amount of shift in terms of time and for dividing said amount of shift by a period of time Tp necessary for a single scanning effected by the laser beam to thereby produce an integral portion n and a residual t of a resulting quotient,
    said first correcting unit is configured to correct the write start timing by a period of time of n×Tp, and
    assuming that said photoconductive element advances by a distance of X for the period of time Tp, said second correcting unit is configured to correct the position where the laser beam is incident to said photoconductive element by t/Tp×X.

* * * * *